(12) United States Patent
Iida et al.

(10) Patent No.: US 6,772,233 B2
(45) Date of Patent: Aug. 3, 2004

(54) DATA STORAGE DEVICE

(75) Inventors: Atsuo Iida, Kawasaki (JP); Keiju Okabayashi, Kawasaki (JP); Shinji Kanda, Kawasaki (JP); Mitsunori Fukazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 324 days.

(21) Appl. No.: 09/939,698

(22) Filed: Aug. 28, 2001

(65) Prior Publication Data

US 2002/0083239 A1 Jun. 27, 2002

(30) Foreign Application Priority Data

Dec. 27, 2000 (JP) ........................................ 2000-398290

(51) Int. Cl.⁷ ................................................. G06F 3/00
(52) U.S. Cl. .................... 710/13; 710/52; 710/72; 710/101; 712/225; 709/215; 711/100
(58) Field of Search ................................ 710/1, 11, 13, 710/52, 54, 72, 74, 101, 102, 103; 709/213, 215; 711/100, 111, 115; 712/225

(56) References Cited

U.S. PATENT DOCUMENTS

| | | | | |
|---|---|---|---|---|
| 5,495,586 A | * | 2/1996 | Adachi et al. | 710/100 |
| 5,515,515 A | * | 5/1996 | Kennedy et al. | 395/283 |
| 5,517,387 A | * | 5/1996 | Smith | 361/686 |
| 5,604,917 A | * | 2/1997 | Saito et al. | 710/49 |
| 5,752,040 A | * | 5/1998 | Kaneko et al. | 395/712 |
| 5,983,298 A | * | 11/1999 | Schultz et al. | 710/103 |
| 5,991,530 A | * | 11/1999 | Okada et al. | 703/25 |

FOREIGN PATENT DOCUMENTS

| | | |
|---|---|---|
| EP | 0666539 A2 | 8/1995 |
| JP | 7-219848 | 8/1995 |
| JP | 11-45210 | 2/1999 |
| JP | 11-85332 | 3/1999 |

* cited by examiner

*Primary Examiner*—Rehana Perveen
*Assistant Examiner*—Rijue Mai
(74) *Attorney, Agent, or Firm*—Staas & Halsey LLP

(57) ABSTRACT

A portable card type data storage device with a large capacity and low power consumption is provided which enalbes two storage mediums with different features to be installed into a single slot of an information processing device. The card type data storage device 100 of the invention includes a case 10 having a connection slot 10*a*, a first connector 11 adapted to be inserted into and connected with a connection slot 201 of an information processing device such as a PC 200, a hard disk 13 housed in the case 10, a second connector 12 for connection with a semiconductor memory 18 inserted into the connection slot 10*a*, and a storage device control section 20. When the first connector 11 is inserted into and connected with the information processing device 200, the storage device control section 20 receives electric power from the information processing device 200, and makes the hard disk 13 and the semiconductor memory 18, which is inserted into the connection slot 10*a* and connected with the second connector 12, function as external storages of the information processing device 200. Thus, two storage mediums comprising the semiconductor memory 18 of low power consumption and the hard disk 13 of a large capacity can be connected with the information processing device 200 through the single slot 201 thereof.

19 Claims, 5 Drawing Sheets

DATA STORAGE DEVICE

BACKGROUND OF THE INVENTION

1. Field of the Invention

The present invention relates to a data storage device, and particularly to a small-sized card type data storage device of a simple structure which can be removably inserted into and connected with a connection slot of an information processing device for connection to an external device so as to perform data transfer therebetween.

2. Description of the Related Art

In the past, storage elements such as magnetic disks and nonvolatile semiconductor memories have widely been used as readable/writable storage mediums for personal computers, etc. For example, a hard disk 70 and a flash memory 60 are separately installed on a personal computer 300, as shown in FIG. 9. When the data prepared by the personal computer 300 is backed up, a main control section 89 carries out control in such a manner that the data is stored into the hard disk 70 through a hard disk control section 84 or into the flash memory 60 through a memory control section 82 using a buffer 83, depending upon the state of a power supply, etc.

In this case, the hard disk 70 is characteristic in that it has a large storage capacity with large power consumption, whereas the flash memory 60 is characteristic in that it has limited power consumption with a small storage capacity. Thus, in the past, these storage devices have generally been used separately for different purposes in such a manner that the hard disk 70 is primarily used for stationary or desktop type models whereas the flash memory 60 is used for portable type models. However, in recent years, there is a growing demand for dealing with mass data such as music data, image data, etc., even with portable type equipment. To satisfy such a demand, there is a trend in that efforts have been made toward miniaturizing storage devices so as to adapt them to the portable type equipment. Alternatively, there is another trend in that the storage capacities of semiconductor memories are increased while keeping the current sizes or dimensions thereof.

As described above, various efforts have been made in the past so as to reduce the physical sizes of storage devices having large storage capacities or increase the storage capacities of semiconductor memories in spite of their current dimensions in order to meet the intended purpose of storing mass data for portable type equipment, but it is not easy to meet the demand for desired storage devices or semiconductor memories of low power consumption with large capacities. In addition, there is another problem in that in the configurations of the current information processing devices such as personal computers, etc., once a certain device is installed into a slot of an information processing device, it is impossible to install another device into the same slot. Moreover, there is also a further demand that one wishes to collect data from desired locations through wireless communications while carrying a small-sized storage device.

SUMMARY OF THE INVENTION

The present invention has been made in view of the above-described circumstances, and has for its object to provide a card type data storage device which is of low power consumption and has a large storage capacity, and which can be removably attached to a slot or the like that is provided on an information processing device.

Another object of the present invention is to provide a card type data storage device which can optionally pick up data through wireless communications.

A further object of the present invention is to provide a card type data storage device which can pick up data independently of an information processing device.

In order to obviate the problems as referred to above, according to a first aspect of the present invention, there is provided a data storage device of the card type adapted to be removably attached to an information processing device to perform data transfer therewith, the device comprising: a storage element for storing data; and an auxiliary device being different from the storage element and adapted to be detachably connected with the storage element for performing data transfer with at least one of the storage element and the information processing device.

With this arrangement, it is possible to write mass data into the storage element, and a semiconductor memory, if used as the auxiliary device, can be efficiently used with low electric power. Alternatively, if a wireless communication card is used as the auxiliary device, data can be easily picked up or transmitted from the storage device or the information processing device connected therewith through wireless communications. Here, note that for the storage element, there may be used a magnetic disk, a phase-change optical disk, a magneto-optical disk, etc., all of which are easily available, thus making it possible to provide the storage element at low cost.

The data storage device, being a card type data storage device which is adapted to be detachably connected with the information processing device as an external unit, can be used independently of the information processing device, and is convenient to carry. In addition, the auxiliary device in the form of a semiconductor memory for example, being detachably connected with the storage element, can be used as a data storage medium common to other equipment such as a digital camera and so on. Moreover, such a semiconductor memory can be replaced with another auxiliary device in the form of a wireless communication card, etc., thus improving ease of use.

In a preferred form of the present invention, the data storage device further comprises a control section for controlling the storage element and the auxiliary device thereby to control data transfer between the storage element and the auxiliary device connected therewith or data transfer among the storage element, the auxiliary device and the information processing device.

With this arrangement, the data storage device can perform data processing independently of the information processing device, so it can also carry out data handling independently. In this case, when the data storage device is installed to the information processing device, electric power can be supplied to the control section from the information processing device so that electric power can be further supplied from the control section to the storage element and the auxiliary device thereby to drive them. Additionally, with this arrangement, it is not necessary to provide a separate power supply in the data storage device, and power can be automatically supplied to the data storage device upon installation or connection thereof with the information processing device.

In another preferred form of the present invention, when the data storage device is installed on the information processing device, electric power is supplied from the information processing device to the control section, which in turn supplies electric power to the storage element and the auxiliary device thereby to drive the storage element and the auxiliary device.

With this arrangement, it is not necessary to provide a separate power supply in the data storage device, and power can be automatically supplied to the data storage device upon installation or connection thereof with the information processing device.

In a further preferred form of the present invention, the auxiliary device comprises a semiconductor memory.

With this arrangement, the storage element and the semiconductor memory can be properly used for efficient utilization of electric power.

In a yet further preferred form of the present invention, the semiconductor memory is a memory device comprising a nonvolatile memory.

In a still further preferred form of the present invention, the nonvolatile memory comprises any one of a flash memory, a ferroelectric memory and a magnetic memory.

These memories unlike DRAMs do not lose their data even without any power being supplied thereto, and hence are suitable for portable use or the like in which there are limitations on power supply.

In a further preferred form of the present invention, the control section stores data in the storage element when the capacity of the data to be stored is large (i.e., equal to or greater than a predetermined value), and stores data in the semiconductor memory when the capacity of the data is small (i.e., less than the predetermined value).

In a further preferred form of the present invention, the control section stores data in the storage element when the data to be stored is streaming data related to image or music.

Thus, the storage element can be used properly according to the capacity of data, so large electric power is not consumed uselessly. In this case, it is practically preferable that the semiconductor memory have a capacity of 100 MB or more and the storage element have a capacity of 2 GB or more.

In a further preferred form of the present invention, the control section determines, upon installation of the semiconductor memory, whether there is data to be saved in the semiconductor memory, and stores data in the storage element when there is data to be saved.

With this arrangement, by saving the data of the semiconductor memory such as, for example, a flash memory into the storage element such as, for example, a hard disk upon each insertion and connection of the flash memory, an automatic backup of the data in the flash memory becomes possible, thus enabling the date to be securely preserved in the hard disk without taking time and trouble.

In a further preferred form of the present invention, the auxiliary device comprises a wireless communication card.

This makes it possible to perform communications by the use of the data storage device, thus providing excellent usability.

In a further preferred form of the present invention, the control section stores data, which is received by the wireless communication card, in the storage element.

In such an arrangement, for instance, when a user visits a region where desired data can be acquired through wireless communications while carrying the data storage device of the present invention, the control section can drive the wireless communication card, receive the desired data and collect it into the storage element in an automatic fashion, and thereafter, the user can confirm and utilize the desired data thus collected in the storage element by means of an information processing device with which the data storage device is connected. In this case, it is also possible for the data storage device to transfer the desired data with the information processing device through wireless communications by using the wireless communication card.

According to a second aspect of the present invention, there is provided a data storage device of the card type adapted to be removably inserted into and connected with an external device connection slot of an information processing device to perform data transfer therewith, the device comprising: a first connector for connection with the information processing device; a built-in storage element; a second connector for connection with a semiconductor memory; and a storage device control section connected to the information processing device, the built-in storage element and the second connector for performing control thereon. When the first connector is inserted into and connected with the information processing device, the storage device control section receives electric power from the information processing device, and makes the storage element and the semiconductor memory connected with the second connector function as external storages of the information processing device.

According to a third aspect of the present invention, there is provided a data storage device of the card type adapted to be removably inserted into and connected with an external device connection slot of an information processing device to perform data transfer therewith, the device comprising: a first connector for connection with the information processing device; a built-in storage element; a second connector for connection with a wireless communication card; and a storage device control section connected to the information processing device, the built-in storage element and the second connector for performing control thereon. When the first connector is inserted into and connected with the information processing device, the storage device control section receives electric power from the information processing device, and makes the storage element function as an external storage of the information processing device, whereas when the wireless communication card is inserted into and connected with the second connector, the storage device control section performs control in such a manner that data received by the wireless communication card is selectively stored in the storage element, or supplied directly to the information processing device.

According to a fourth aspect of the present invention, there is provided a data storage device of the card type adapted to be removably inserted into and connected with an external device connection slot of an information processing device to perform data transfer therewith, the device comprising: a first connector for connection with the information processing device; a battery; a built-in storage element; a second connector for connection with a semiconductor memory; and a storage device control section connected to the information processing device, the battery, the built-in storage element and the second connector for performing control thereon. When the first connector is not inserted in and connected with the information processing device, the storage device control section is driven by the battery to store data, which is stored in the semiconductor memory inserted into and connected with the second connector, in the storage element, whereas when the first connector is inserted into and connected with the information processing device, the storage device control section receives electric power from the information processing device, and makes the storage element and the semiconductor memory inserted into and connected with the second connector function as external storages of the information processing device.

According to a fifth aspect of the present invention, there is provided a data storage device of the card type adapted to be removably inserted into and connected with an external device connection slot of an information processing device to perform data transfer therewith, the device comprising: a first connector for connection with the information processing device; a battery; a built-in storage element; a second connector for connection with a wireless communication card; and a storage device control section connected to the information processing device, the battery, the built-in storage element and the second connector for performing control thereon. When the first connector is not inserted in and connected with the information processing device, the storage device control section is driven by the battery to store data, which is received by the wireless communication card inserted into and connected with the second connector, in the storage element, whereas when the first connector is inserted into and connected with the information processing device, the storage device control section receives electric power from the information processing device, and makes the storage element function as an external storage of the information processing device.

In a further preferred form of the present invention, the information processing device has a PC card slot, and the first connector is adapted to be inserted into the PC card slot of the information processing device, and the storage device control section has a PC card interface through which data can be transferred between the storage device control section and the information processing device via the first connector.

In a further preferred form of the present invention, the storage element comprises any of a magnetic disk, a phase-change optical disk and a magneto-optical disk.

According to a sixth aspect of the present invention, there is provided a data storage device of the card type adapted to be removably attached to an information processing device to perform data transfer therewith, the device comprising: a card-shaped case having a first end and a second end on opposite sides thereof, the case being provided at its first end with a connection slot into which a semiconductor memory is adapted to be inserted; a storage element housed in the case for storing data; a first connector provided at the second end of the case for connection with the information processing device; and a second connector disposed in the case at a location near the connection slot for connection with the semiconductor memory which is inserted into the connection slot.

DESCRIPTION OF THE PREFERRED EMBODIMENTS

Now, preferred embodiments of the present invention will be described below in detail while taking a card type data storage device as a concrete example with reference to the accompanying drawings.

Embodiment 1

Figure 1:
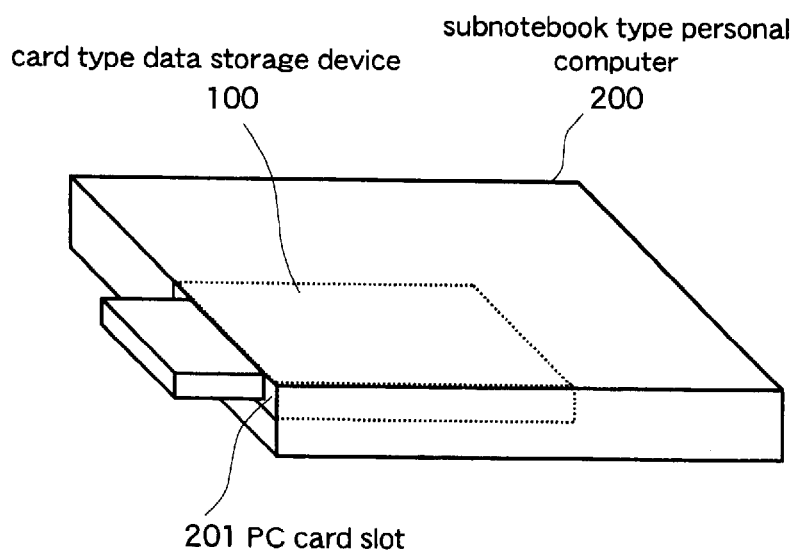
FIG. 1 is a perspective view illustrating the external appearance of a card type data storage device installed on an information processing device according to an embodiment of the present invention.
Figure 2:
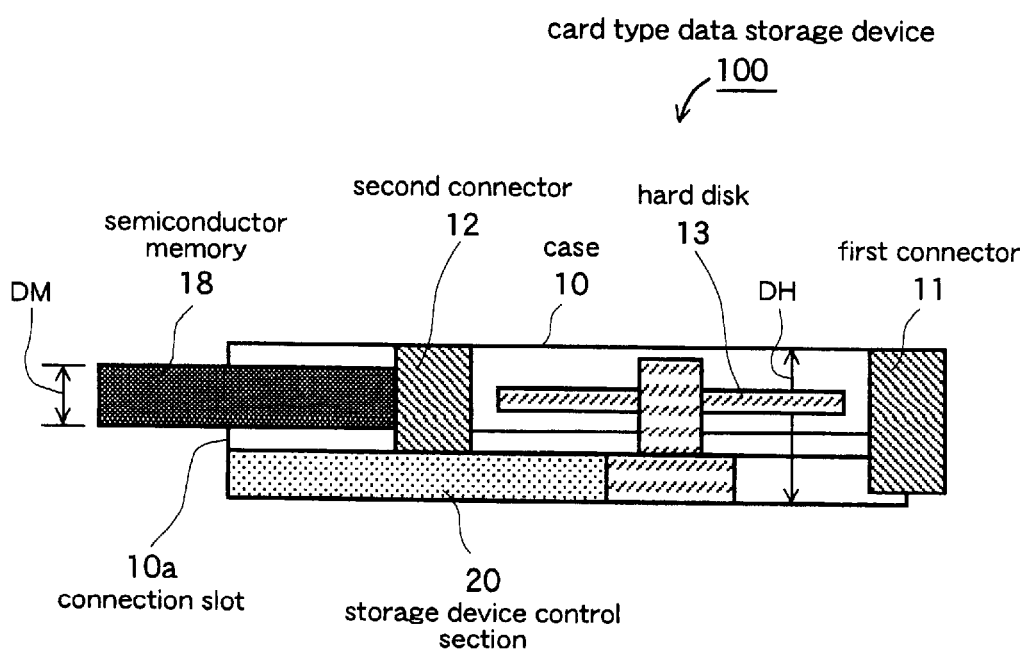
FIG. 2 is an enlarged cross sectional view of the card type data storage device illustrated in FIG. 1.
Figure 3:
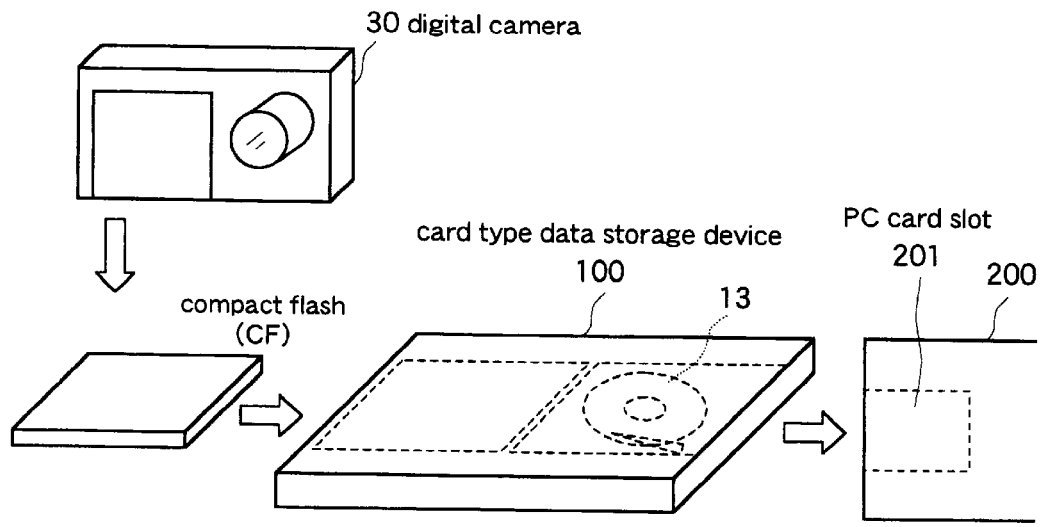
FIG. 3 is a view for explaining the case where the card type data storage device is used with a digital camera.
Figure 4:
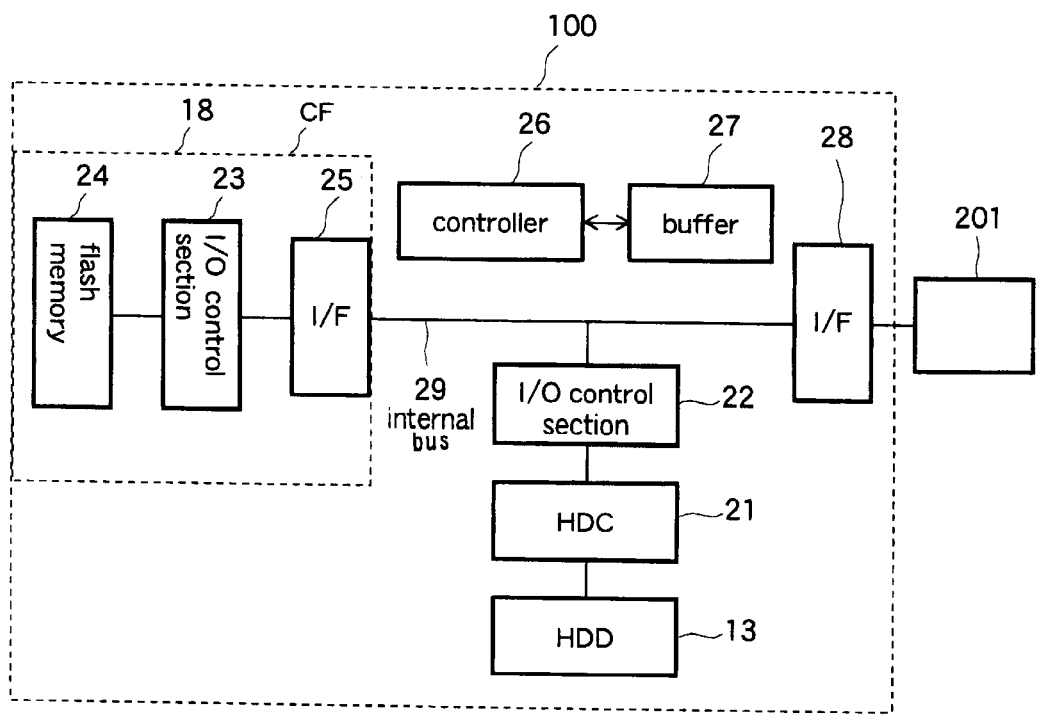
FIG. 4 is a block diagram illustrating a storage device control section of the card type data storage device illustrated in FIG. 1 and FIG. 2.
Figure 5:
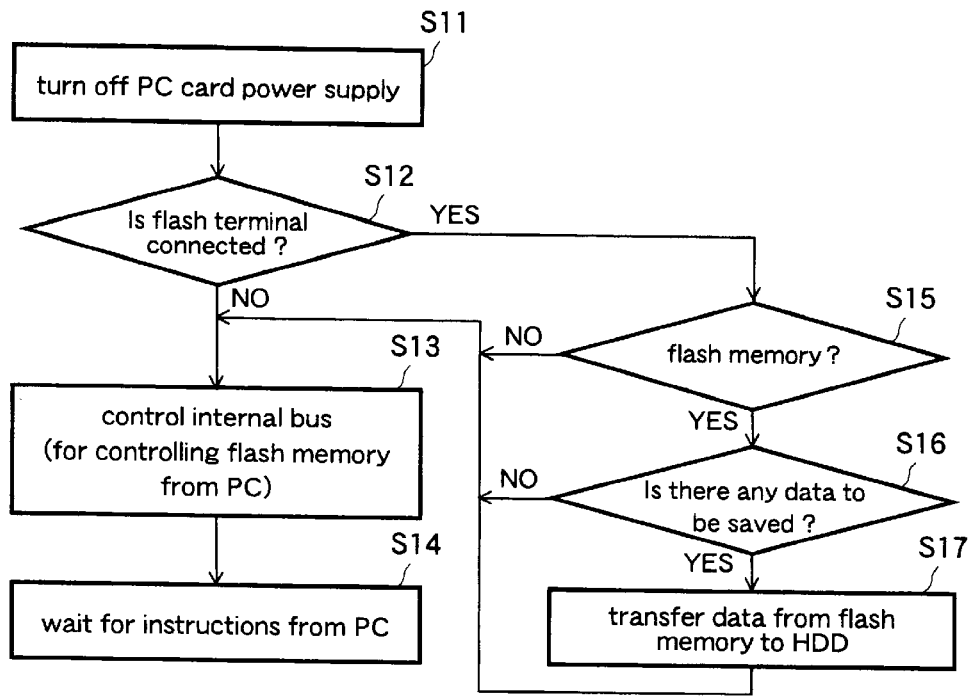
FIG. 5 is a flow chart for explaining an exemplary operation of the storage device control section of FIG. 4.

FIG. 1 is a perspective view illustrating the external appearance of a card type data storage device of the present invention installed on an information processing device. FIG. 2 is an enlarged cross sectional view of the card type data storage device illustrated in FIG. 1. FIG. 3 explains the case in which the card type data storage device is used for a digital camera. FIG. 4 illustrates, in a block diagram, a storage device control section of the card type data storage device illustrated in FIG. 1 and FIG. 2. FIG. 5 is a flow chart for explaining an exemplary operation of the storage device control section illustrated in FIG. 2 and FIG. 4.

In FIG. 1, the card type data storage device, generally designated at 100, is inserted in a PC card slot 201 of a personal computer 200 of the subnotebook type, which is an information processing device. This card type data storage device 100 can be freely pulled out from the PC card slot 201. In other word, the data storage device 100 is removalby mounted to the PC card slot 201. As shown in FIG. 2, the card type data storage device 100 includes a card type case 10 that takes a thin hexahedron shape with one side thereof opened to form a connection slot 10a, a first connector 11 arranged on the other side of the card type case 10 opposite the connection slot 10a, a hard disk 13 that constitutes a storage element and is arranged in the case 10 inwardly of the first connector 11, a second connector 12 arranged on the side of the hard disk 13 opposite the first connector 11 for connection with a semiconductor memory 18 inserted into the connection slot 10a, a storage device control section 20 arranged on the side of the hard disk 13 opposite the first connector 11 and mounted on the bottom of the case 10 at a location under the second connector 12. Thus, by first inserting the card type data storage device 100 with the built-in hard disk 13 into the PC card slot 201, and then inserting the semiconductor memory 18 thereinto, it is possible to connect two storage mediums (i.e., the hard disk 13 and the semiconductor memory 18) having different features with the personal computer 200 via the single PC card slot 201.

In the above example, the personal computer 200 of the subnotebook type is enumerated as an information processing device, but it may be a personal digital assistant (PDA). Moreover, the case 10 has a length of 85 mm and a thickness DH of 5 mm so as to suit one of known standards. In addition, the semiconductor memory 18, which is inserted into the connection slot 10a to be connected with the second connector 12, has a thickness DM of 3 mm so as to suit one of known standards as with the case 10. The depth of the connection slot 10a in the case 10 is set to a length slightly shorter than the length of the semiconductor memory 18 so that when the semiconductor memory 18 is inserted into the connection slot 10a, a part of the semiconductor memory 18 extends outward from the connection slot 10a so as to be easily held by a hand of a user.

The hard disk 13 has been shown as a storage element, but it may instead be a magnetic disk, a phase-change optical disk, a magneto-optical disk, etc. Also, the semiconductor memory 18 may be a memory or storage device comprising a nonvolatile memory. The nonvolatile memory may be any of a flash memory, ferroelectric memory (FRAM), magnetic memory (MRAM), etc., and some preferred examples using a flash memory may be a compact flash (CF), a smart media (SM), etc., which are the standard products. FIG. 3 shows the state in which the card type data storage device 100 with the built-in hard disk 13 is inserted into the PC card slot 201 of the personal computer 200, and the semiconductor memory 18 in the form of a compact flash, which a digital camera 30 used to take pictures, is then inserted into the card type data storage device 100. As illustrated in FIG. 3, the semiconductor memory 18 can be used as a data storage medium for both the digital camera 30 and the information processing device in the form of the personal computer 200.

FIG. 4 is a block diagram for explaining the configuration of the storage device control section 20 of the card type data storage device 100 illustrated in FIG. 2 and FIG. 3. When the card type data storage device 100 is inserted into the PC card slot 201, it is supplied with electric power through the PC card slot 201. A hard disk controller (HDC) 21 controls the hard disk (HDD) 13 so that data is transferred between the hard disk 12 and an internal bus 29 through an I/O control section 22. When the semiconductor memory 18 such as a compact flash, etc., is inserted into the second connector 12 (see FIG. 2), an I/O control section 23 reads data from a memory part in the form of a flash memory 24, and outputs data to the internal bus 29 through an interface (I/F) 25. A controller 26 receives data from the flash memory 24 through the internal bus 29, and performs a backup of data by using a buffer 27 or the HDD 13. Alternatively, the controller 26 performs data transfer between these elements (i.e., HDD 13, flash memory 24, buffer 27) and the personal computer 200 (hereinafter referred to as PC) through an interface (I/F) 28.

Now, reference will be made to the operation of the data storage device in the case of a flash memory media such as a compact flash, a smart media, etc., being used as the semiconductor memory 18 while referring to a flow chart of FIG. 5. When inserted into the PC card slot 201, the card type data storage device 100 is supplied with electric power through the PC card slot 201 (in step S11). Then, the controller 26 determines whether a connection is made at the second connector 12 (in step S12). When there is no connection at the second connector 12 ("NO" in step S12), the controller 26 controls the internal bus 29 to set it in such a manner that the PC 200 can control a flash memory media to be inserted into the connection slot 10a (in step S13). Thereafter, the controller 26 becomes waiting for instructions from the PC 200 (in step S14). When it is determined in step S12 that a connection is made at the second connector 12 ("YES" in step S12), a determination is made whether what is connected with the second connector 12 is a flash memory media (in step S15). If it is not a flash memory ("NO" in step S15), the control flow goes to step S13, whereas if it is a flash memory ("YES" in step S15), the control flow goes to step S16 where it is further determined whether there is any data to be saved (in step S16). When there is no data to be saved ("NO" in step S16), the control flow proceeds to step S13, whereas when there is data to be saved ("YES" in step S16), the control flow proceeds to step S17 where the controller 26 saves the data of the flash memory media to the hard disk 13, and thereafter the control flow shifts to step S13. Accordingly, in this case, data is automatically saved to the hard disk whenever the flash memory media is inserted into the connection slot 10a and connected with the second connector 12. Although in the above-mentioned example description has been made with the card type data storage device 100 having no power supply source or battery installed thereon, it is preferable that the card type data storage device 100 can be removably attached to a PDA, or a battery be incorporated in the card type data storage device 100, or a battery be detachably mounted exteriorly on the case 10.

Embodiment 2

Figure 6:
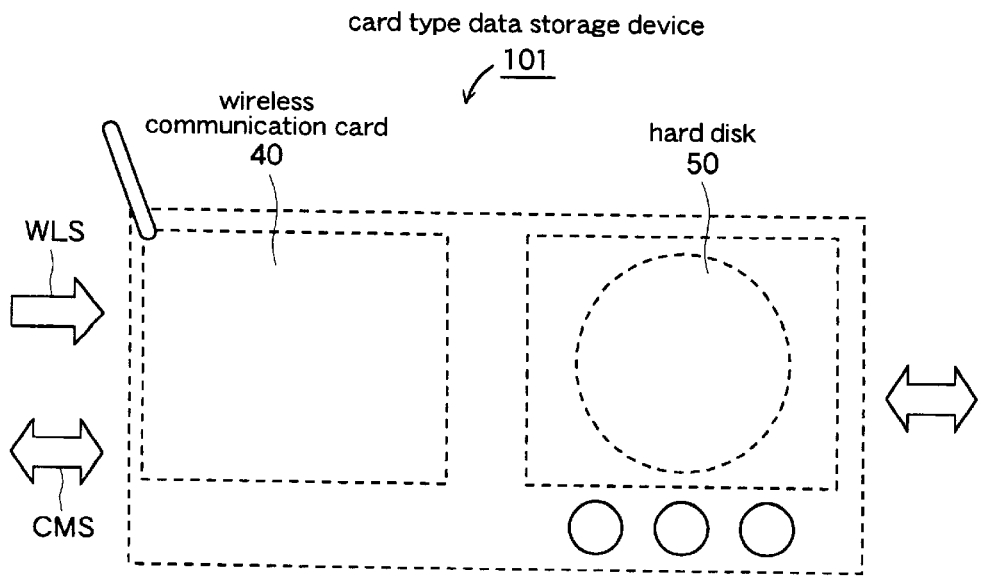
FIG. 6 is a view illustrating a card type data storage device according to another embodiment of the present invention.

FIG. 6 shows a card type data storage device according to another embodiment of the present invention, and FIG. 7 explains an example of using the card type data storage device of FIG. 6. A card type data storage device 101 shown in FIG. 6 enables a wireless communication card 40 to be installed thereon instead of the semiconductor memory. The wireless communication card 40 may be a wireless LAN card, a PHS card, a Bluetooth card, etc. In this case, the card type data storage device 101 can be attached to an information processing device such as a PDA so as to be supplied with power therefrom, alternatively a rechargeable battery may be incorporated in the card type data storage device 101 so as to supply it with power. In addition, a communications application is stored on the hard disk 50. By executing the communications application, radio signals WLS sent from respective base stations can be received by the wireless communication card 40 such as a wireless LAN card or PHS card, from which the data thus received can be accumulated or saved on the hard disk 50. When the card type data storage device 101 is installed in and connected with a PC, the data accumulated on the hard disk 50 can supplied to the PC. Moreover, when a Bluetooth card is used as the communications card 40, the card type data storage device 101 can perform data transfer with a PC, a digital home electric appliance or the like through wireless communications. In this case, it is preferable that power be supplied to the card type data storage device 101 from the PC or digital home electric appliance to operate the same while the battery of the device 101 is automatically charged during the operation of the device 101.

Figure 7A:
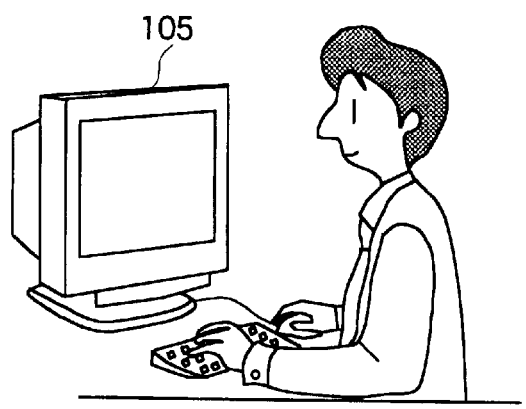
FIG. 7 is a view for explaining an exemplary use of the card type data storage device of FIG. 6.
Figure 7B:
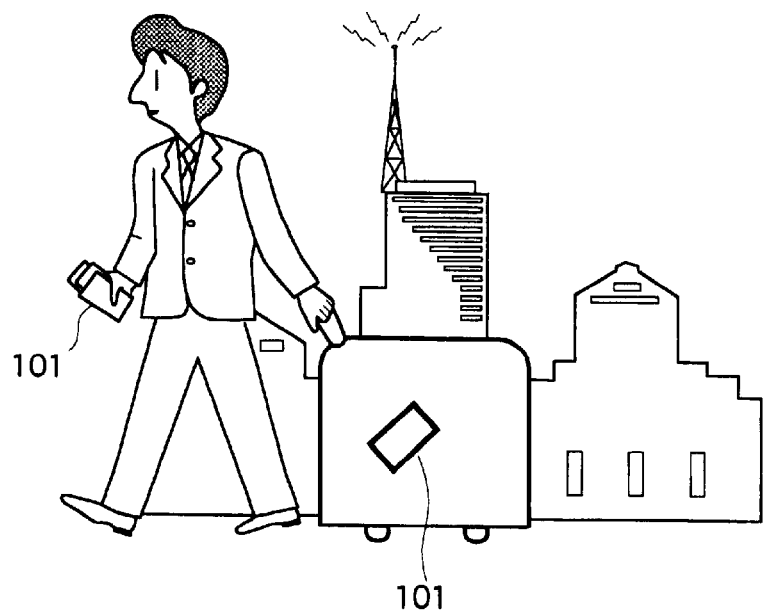
Figure 7C:
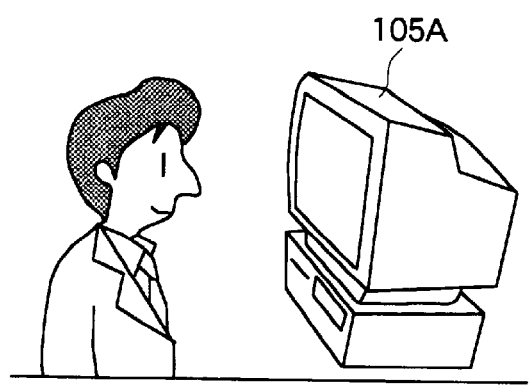

In cases where a user wants to carry the card type data storage device 101 as depicted in FIG. 6 to a variety of places and to use it there, the user first attaches the card type data storage device 101 to a stationary PC 105, and registers or installs on the hard disk 50 of the card type data storage device 101 the data and/or applications assiciated with information to be collected by him or her and/or collection methods for the same, as shown in FIG. 7A. Thereafter, the user removes the card type data storage device 101 from the PC 105, and goes to a desired place while carrying the device 101 in his or her hand or in a bag or the like (though both cases being shown in FIG. 8) if the device 101 has its own power supply. On the other hand, if the device 101 is not provided with its own power supply, the user installs the device 101 onto a portable information processing device such as a PDA and carries them together to a desired place (see FIG. 7B). When entering the coverage of a wireless or radio communications system concerned, the applications stored in the card type data storage device 101 cooperate with server applications in a network of the wireless or radio communications system whereby necessary data is automatically downloaded to the hard disk 50 in the device 101. After coming back from the destination or desired place, the user can confirm and utilize the data thus collected by connecting the card type data storage device 101 with an appropriate information processing device such as a PC 105A, which is provided with a PC card interface or a wireless interface suited to the card type data storage device 101, and displaying the data on the screen of a display connected with the device 101 (see FIG. 7C). Accordingly, the card type data storage device 101 can be used as an intelligent peripheral device, which can be charged or supplied with desired information in street corners at any desired time. It is needless to say that such a mode of using the card type data storage device 101 is similarly available during enjoying driving on a car.

Figure 8:
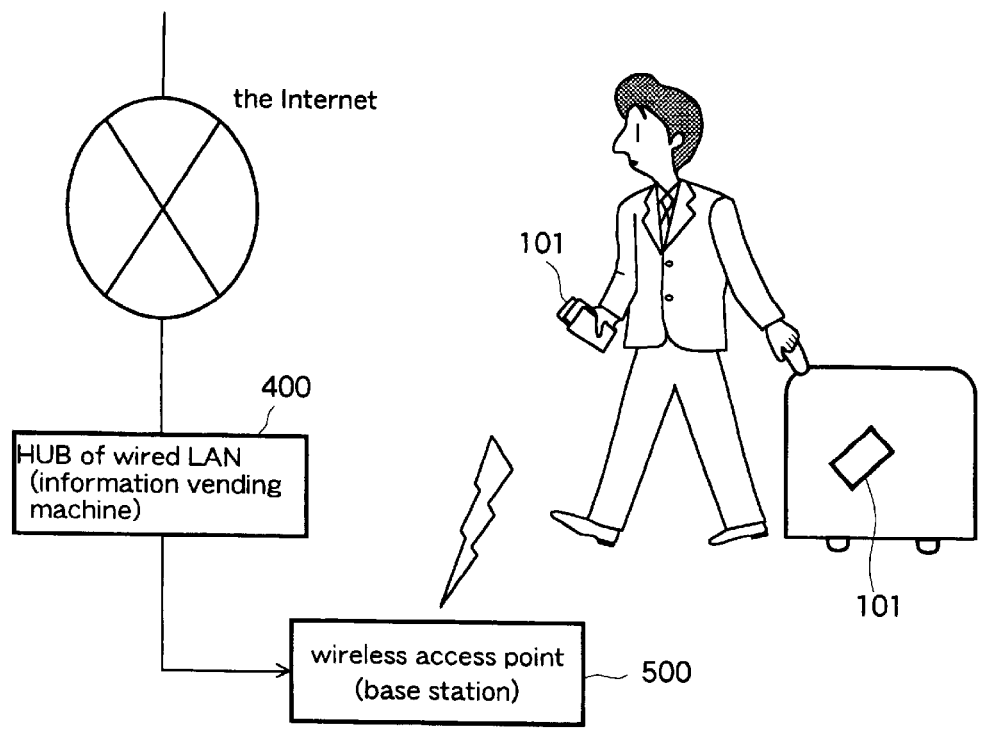
FIG. 8 is a view for explaining another exemplary use of the card type data storage device of FIG. 6.
Figure 9:
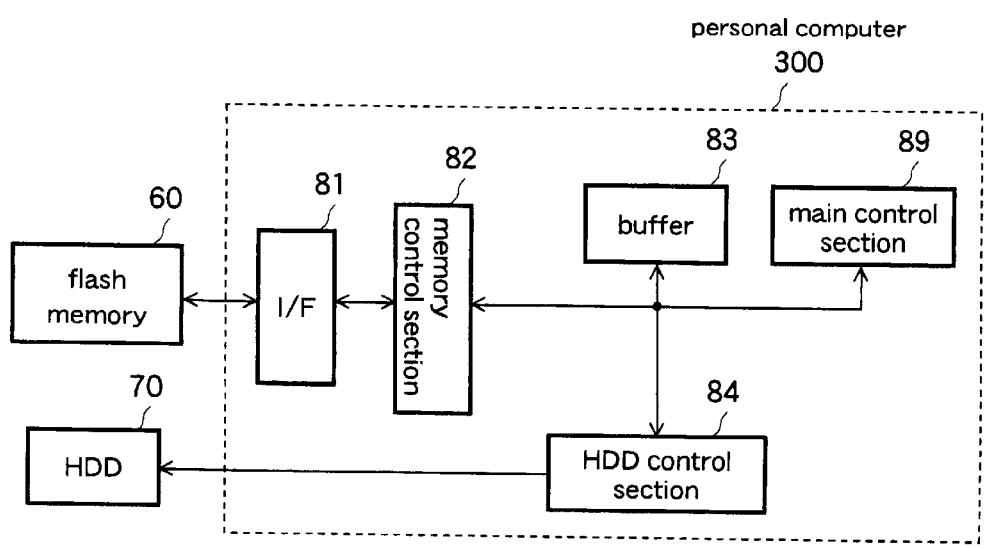
FIG. 9 is a block diagram for explaining a system configuration of a known personal computer.

Besides the exemplary application illustrated in FIG. 7, another application of the invention is available as shown in FIG. 8. That is, in a large-scale store, etc., there are set up a wireless base station 500 (constituting a wireless access point), which has coverage of the whole store, and an information vending machine 400 (to which a HUB of a cable LAN is installed, for instance). A user selects desired information on an unillustrated console panel of the information vending machine 400 thus set up, and puts money into the machine for the payment of the corresponding charge. Then, an identification code of the user is set between the card type data storage device 101 with the wireless communication card 40 attached thereto, which is carried by the user, and the information vending machine 400, so that the selected information begins to be transmitted from the information vending machine 400 to the card type data storage device 101 through wireless communications. After this, the user can freely spend time in shopping in the store, during which the desired information is automatically written on the hard disk 50 of the card type data storage device 101. If desired, the user can properly confirm the written data by the use of an appropriate audio visual device installed in the store.

Although a few embodiments of the present invention have been shown and described herein, the present invention is not limited to these embodiment, but various changes or modifications thereof can of course be made without departing from the spirit and scope of the invention as defined in the appended claims.

As is apparent from the foregoing, the present invention provides the following remarkable advantages.

Since the card type data storage device of the present invention is constructed as explained above, it is possible to connect two storage mediums comprising a semiconductor memory and a storage element, e.g., a flash memory media and a hard disk, with an information processing device such as a personal computer by using a single PC card slot provided in the information processing device. This enables to provide a mass storage media of an increased storage capacity with reduced power consumption while utilizing excellent features of both the semiconductor memory and the storage element. In addition, a wireless communication card can be connected with the information processing device in place of the semiconductor memory, thus making it possible to add a wireless communications function while providing a storage function of the storage element as well. In this case, a battery may be incorporated in or removably attached to the card type data storage device, which can be carried by the user to a desired place, so that desired data can be received by the device through wireless communications and collected or accumulated on the storage element. Thereafter, by inserting the card type data storage device into the information processing device, it is possible to display and confirm the content of the collected data.

What is claimed is:

1. A data storage device of the card type adapted to be removably attached to an information processing device to perform data transfer therewith, said device comprising:
    a storage element for storing data; and
    an auxiliary device being different from said storage element and adapted to be detachably connected with said storage element for performing data transfer with at least one of said storage element and said information processing device, wherein the data is stored in the storage element based upon characteristics of the data.

2. The data storage device according to claim 1, further comprising a control section for controlling said storage element and said auxiliary device thereby to control data transfer between said storage element and said auxiliary device connected therewith or data transfer among said storage element, said auxiliary device and said information processing device.

3. The data storage device according to claim 2, wherein when said data storage device is installed on said information processing device, electric power is supplied from said information processing device to said control section, which in turn supplies electric power to said storage element and said auxiliary device thereby to drive said storage element and said auxiliary device.

4. The data storage device according to claim 2, wherein said auxiliary device comprises a semiconductor memory.

5. The data storage device according to claim 4, wherein said semiconductor memory is a memory device comprising a nonvolatile memory.

6. The data storage device according to claim 5, wherein said memory device comprising a nonvolatile memory comprises any one of a flash memory, a ferroelectric memory and a magnetic memory.

7. The data storage device according to claim 4, wherein said control section stores data in said storage element when the data to be stored is streaming data related to image or music.

8. The data storage device according to claim 4, wherein said control section determines, upon installation of said semiconductor memory, whether there is data to be saved to said semiconductor memory, and stores data in said storage element when there is data to be saved.

9. The data storage device according to claim 2, wherein said auxiliary device comprises a wireless communication card.

10. The data storage device according to claim 9, wherein said control section stores data, which is received by said wireless communication card, in said storage element.

11. The data storage device according to claim 1, wherein said storage element comprises any of a magnetic disk, a phase-change optical disk and a magneto-optical disk.

12. The data storage device according to claim 1, wherein said storage element has a large capacity, and said auxiliary element comprises a memory which is different from said storage element and which is adapted to be detachably connected from said storage element and incorporated in said data storage device.

13. A data storage device of the card type adapted to be removably attached to an information processing device to perform data transfer therewith, said device comprising:
    a storage element for storing data;
    an auxiliary device being different from said storage element and adapted to be detachably connected with said storage element for performing data transfer with at least one of said storage element and said information processing device, said auxiliary device comprising a semiconductor memory; and
    a control section controlling said storage element and said auxiliary device thereby to control data transfer between said storage element and said auxiliary device connected therewith or data transfer among said storage element, said auxiliary device and said information processing device, wherein said control section stores data in said storage element when the capacity of the data to be stored is equal to or greater than a predetermined value, and stores data in said semiconductor memory when the capacity of the data is less than the predetermined value.

14. A data storage device of the card type adapted to be removably inserted into and connected with an external device connection slot of an information processing device to perform data transfer therewith, said device comprising:

a first connector for connection with said information processing device;

a built-in storage element;

a second connector for connection with a semiconductor memory; and a storage device control section connected to said information processing device, said built-in storage element and said second connector for performing control thereon;

wherein when said first connector is inserted into and connected with said information processing device, said storage device control section receives electric power from said information processing device, and makes said storage element and said semiconductor memory connected with said second connector function as external storages of said information processing device, wherein the storage device control section stores data in the built-in storage element based upon characteristics of the data.

15. The data storage device according to claim 14, wherein said information processing device has a PC card slot, and said first connector is adapted to be inserted into said PC card slot of said information processing device, and said storage device control section has a PC card interface through which data can be transferred between said storage device control section and said information processing device via said first connector.

16. A data storage device of the card type adapted to be removably inserted into and connected with an external device connection slot of an information processing device to perform data transfer therewith, said device comprising:

a first connector for connection with said information processing device;

a built-in storage element;

a second connector for connection with a wireless communication card; and a storage device control section connected to said information processing device, said built-in storage element and said second connector for performing control thereon;

wherein when said first connector is inserted into and connected with said information processing device, said storage device control section receives electric power from said information processing device, and makes said storage element function as an external storage of said information processing device, and when said wireless communication card is inserted into and connected with said second connector, said storage device control section performs control in such a manner that data received by said wireless communication card is selectively stored in said storage element, or supplied directly to said information processing device, wherein the storage device control section stores data in the built-in storage element based upon characteristics of the data.

17. A data storage device of the card type adapted to be removably inserted into and connected with an external device connection slot of an information processing device to perform data transfer therewith, said device comprising:

a first connector for connection with said information processing device;

a built-in storage element;

a second connector for connection with a wireless communication card; and a storage device control section connected to said information processing device, said built-in storage element and said second connector for performing control thereon;

wherein when said first connector is not inserted into and connected with said information processing device, said storage device control section is driven by said battery to store data, which is stored in said semiconductor memory inserted into and connected with said second connector, in said storage element, and when said first connector is inserted into and connected with said information processing device, said storage device control section receives electric power from said information processing device, and makes said storage element and said semiconductor memory inserted into and connected with said second connector function as external storages of said information processing device, wherein the storage device control section stores data in the built-in storage element based upon characteristics of the data.

18. A data storage device of the card type adapted to be removably inserted into and connected with an external device connection slot of an information processing device to perform data transfer therewith, said device comprising:

a first connector for connection with said information processing device; a battery;

a built-in storage element;

a second connector for connection with a wireless communication card; and a storage device control section connected to said information processing device, said battery, said built-in storage element and said second connector for performing control thereon;

wherein when said first connector is not inserted in and connected with said information processing device, said storage device control section is driven by said battery to store data, which is received by said wireless communication card inserted into and connected with said second connector, in said storage element, and when said first connector is inserted into and connected with said information processing device, said storage device control section receives electric power from said information processing device, and makes said storage element function as an external storage of said information processing device, wherein the storage device control section stores data in the built-in storage element based upon characteristics of the data.

19. A data storage device of the card type adapted to be removably attached to an information processing device to perform data transfer therewith, said device comprising:

a card-shaped case having a first end and a second end on opposite sides thereof, said case being provided at its first end with a connection slot into which a semiconductor memory is adapted to be inserted;

a storage element housed in said case for storing data;

a first connector provided at the second end of said case for connection with said information processing device; and a second connector disposed in said case at a location near said connection slot for connection with said semiconductor memory which is inserted into said connection slot, wherein the data is stored in the storage element based upon characteristics of the data.

* * * * *

UNITED STATES PATENT AND TRADEMARK OFFICE
CERTIFICATE OF CORRECTION

PATENT NO. : 6,772,233 B2
DATED : August 3, 2004
INVENTOR(S) : Atsuo Iida et al.

It is certified that error appears in the above-identified patent and that said Letters Patent is hereby corrected as shown below:

<u>Title page,</u>
Item [57], ABSTRACT,
Line 3, please delete "enalbes" and insert -- enables --.

Signed and Sealed this

Twenty-eighth Day of December, 2004

JON W. DUDAS
*Director of the United States Patent and Trademark Office*